UNITED STATES PATENT OFFICE.

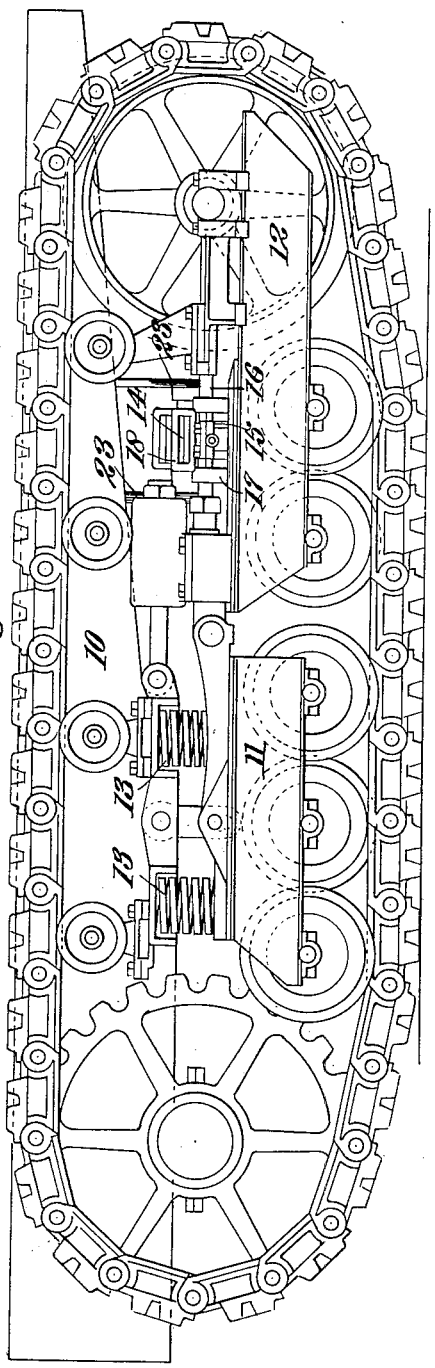

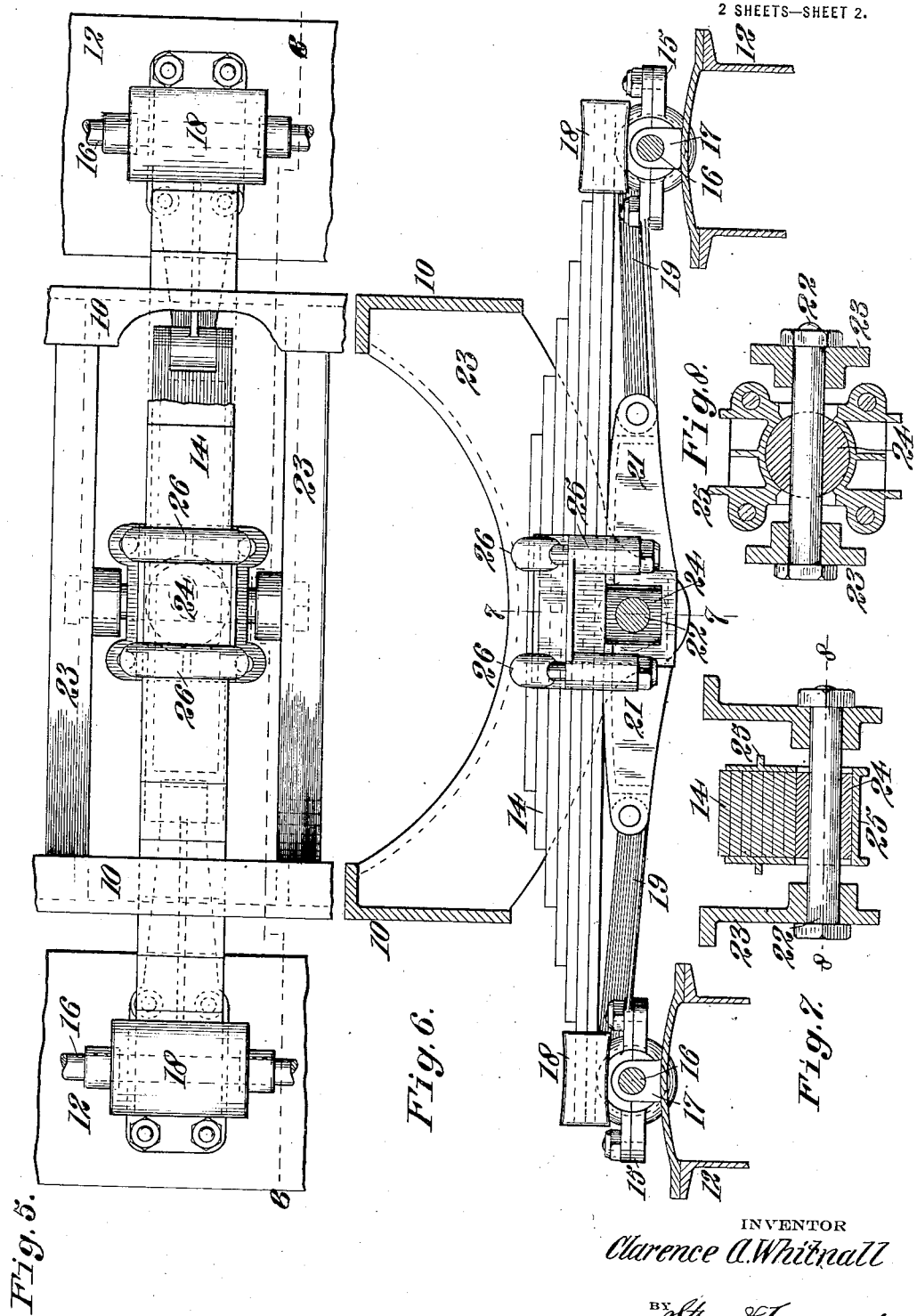

CLARENCE A. WHITNALL, OF PEORIA, ILLINOIS, ASSIGNOR TO THE HOLT MANUFACTURING COMPANY, OF STOCKTON, CALIFORNIA, A CORPORATION OF CALIFORNIA.

EQUALIZER-BAR FOR CHAIN-TRACK TRACTORS.

1,395,021. Specification of Letters Patent. Patented Oct. 25, 1921.

Application filed September 16, 1919. Serial No. 324,194.

*To all whom it may concern:*

Be it known that I, CLARENCE A. WHITNALL, a citizen of the United States, residing at Peoria, in the county of Peoria and State of Illinois, have invented new and useful Improvements in Equalizer-Bars for Chain-Track Tractors, of which the following is a specification.

This invention relates to tractors of the chain track type, and more particularly to an equalizer bar for carrying the main frame upon the truck mechanisms.

It has for its object to make use of a leaf spring in this connection so that the main frame shall be properly cushioned, and in order that the freedom of action of the spring shall not be interfered with, the said leaf spring is slidably mounted at its ends upon the truck mechanisms, and in this connection novel means are made use of to connect opposite truck mechanisms together for the purpose of maintaining them in parallel relation.

Referring to the accompanying drawings:

Figure 1 shows a side elevation of a tractor embodying my invention.

Fig. 2 shows a sectional view of the connection between the equalizer bar and one of the truck mechanisms, being taken on the line 2—2 of Fig. 3.

Fig. 3 shows a detail view in elevation of this connection.

Fig. 4 shows a sectional view of the same, taken on the line 4—4 of Fig. 2.

Fig. 5 shows a fragmentary plan view of the equalizer bar and connected parts.

Fig. 6 shows a sectional view in elevation of the same.

Fig. 7 shows a detail sectional view of the connection between the equalizer bar and the main frame, taken on the line 7—7 of Fig. 6.

Fig. 8 shows a sectional view, taken on the line 8—8 of Fig. 7.

The tractor shown herein, to which my improvements have been applied, comprises a main frame 10, at opposite sides of which are articulated roller truck frames 11 and 12. The main frame is supported upon the rear truck members 11 by means of coil springs 13, and at its forward end is supported upon the forward truck members 12 by means of the novel equalizer bar about to be described. This equalizer bar comprises a laminated or leaf spring 14, extending transversely between opposite forward truck members.

Upon each truck frame is a bearing 15 carried by a journal pin 16 fixed in lugs 17 secured to the truck frame. This bearing 15 forms a head 18 of a link 19, and above the said head is an opening or slot 20 in which the end of the leaf spring is received. The links 19 extend inwardly and are connected, pivotally, each to a rock-arm 21, said rock arm being carried at its center upon a fore and aft extending pin 22, which pin is mounted in a yoke 23 fixed to the main frame. The connection between the rock-arm 21 and pin 22 includes a ball-shaped member 24, received in a socket formed on a clip member 25, the said clip member 25, in conjunction with the clips 26, serving to secure the leaf spring 14 and rock-arm 21 together. This form of connection allows the main frame and rock-arm and likewise the leaf spring 14 to rock freely on the fore and aft extending pin 22 and allows a certain amount of relative movement in a horizontal plane, due to the ball and socket arrangement, as will be understood by referring to Fig. 8. It will also be seen that the outer ends of the leaf spring move about the same pivotal connection as the outer ends of the links 19, due to the fact that the keepers 20 are formed upon the heads of the links 19.

In operation, the truck members are free to move vertically independently of each other and of the main frame in passing over irregularities. In addition to this vertical movement of the truck members the main frame is spring supported on the truck members, with the result that severe strains and tests are not imparted to the main frame. The links 19 and rock-arm 21 in no wise interfere with the flexibility and freedom of movement of the truck mechanisms and main frame in the desired respects, but at the same time they effectively tie opposite truck mechanisms together so that the said truck mechanisms are maintained in parallel relation. The presence of these links and rock-arm make it possible to employ a leaf spring for cushioning the main frame and also to employ a simple slidable connection between this leaf spring and the truck frames such as has been described.

Various chages in the construction and arrangement of the several parts herein shown and described may be employed without departing from the spirit of my invention as disclosed in the appended claims.

Having thus described my invention, what I claim and desire to secure by Letters Patent is:

1. In a vehicle, a main frame, a truck mechanism of the endless self-laying track type at each side of the main frame for supporting the latter and load-supporting connections for the main frame, one of said connections comprising a transversely extending leaf spring connected pivotally at its center to the main frame, and having its ends resting upon opposite truck mechanisms and movable freely thereon, and means adjacent the spring for preventing lateral movement of opposite truck frames relative to each other.

2. In a vehicle, a main frame, a truck mechanism of the endless self-laying track type at each side of the main frame for supporting the latter, load-supporting connections for the main frame, one of said connections comprising a transversely extending leaf spring connected pivotally at its center to the main frame, and having its ends resting upon opposite truck mechanisms and movable freely thereon, and jointed links between opposite truck mechanisms for maintaining said truck mechanisms in parallel relation.

3. In a vehicle, a main frame, a truck mechanism of the endless self-laying track type at each side of the main frame for supporting the latter, load-supporting connections for the main frame, one of said connections comprising a transversely extending leaf spring connected pivotally at its center to the main frame, and having its ends resting upon opposite truck mechanisms and movable freely thereon, and jointed links between opposite truck mechanisms for maintaining said truck mechanisms in parallel relation, said jointed links comprising a lever pivotally connected to the main frame concentrically with the leaf spring and a link pivotally connected to each end of the lever and to the adjacent truck mechanism.

4. In a vehicle, the combination of a main frame, a truck mechanism of the endless self-laying track type at each side of the main frame for supporting the latter and load-supporting connections for the main frame, one of said connections including a transversely extending leaf spring pivotally connected at its center to the main frame, a pivotally mounted bearing member on each truck mechanism receiving one end of the leaf spring slidably, and jointed link connections between opposite bearing members for maintaining said truck mechanisms in parallel relation.

In testimony whereof I have hereunto set my hand in the presence of two subscribing witnesses.

CLARENCE A. WHITNALL.

Witnesses:
WILLIAM TURNBULL,
E. G. NORELIUS.